(12) United States Patent
Woo

(10) Patent No.: US 7,251,615 B2
(45) Date of Patent: Jul. 31, 2007

(54) MARKDOWN MANAGEMENT

(75) Inventor: Jonathan W. Woo, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 10/165,041

(22) Filed: Jun. 7, 2002

(65) Prior Publication Data

US 2003/0229502 A1 Dec. 11, 2003

(51) Int. Cl.
*G06F 17/30* (2006.01)
*G06F 7/60* (2006.01)
*G07G 1/00* (2006.01)

(52) U.S. Cl. .............. 705/10; 705/400; 703/2
(58) Field of Classification Search ............ 705/1, 705/7, 8, 9, 10, 11, 14, 26, 27, 28, 29, 37, 705/400, 20, 22; 703/2; 706/925
See application file for complete search history.

(56) References Cited

U.S. PATENT DOCUMENTS

| | | | |
|---|---|---|---|
| 5,237,496 A | 8/1993 | Kagami et al. | |
| 5,237,498 A | 8/1993 | Tenma et al. | |
| 5,450,314 A | 9/1995 | Kagami et al. | |
| 5,758,328 A | 5/1998 | Giovannoli | |
| 5,765,143 A | 6/1998 | Sheldon et al. | |
| 5,822,736 A | 10/1998 | Hartman et al. | |
| 5,933,813 A | 8/1999 | Teicher et al. | |
| 5,963,919 A | 10/1999 | Brinkley et al. | |
| 5,974,396 A | 10/1999 | Anderson et al. | |
| 5,983,224 A | 11/1999 | Singh et al. | |
| 5,987,425 A | 11/1999 | Hartman et al. | |
| 6,006,196 A | 12/1999 | Feigin et al. | |
| 6,009,407 A | 12/1999 | Garg | |
| 6,029,139 A | 2/2000 | Cunningham et al. | |
| 6,061,691 A | 5/2000 | Fox | |
| 6,092,049 A | 7/2000 | Chislenko et al. | |
| 6,151,582 A | 11/2000 | Huang et al. | |
| 6,205,431 B1 | 3/2001 | Willemain et al. | |
| 6,230,150 B1 | 5/2001 | Walker et al. | |
| 6,253,187 B1* | 6/2001 | Fox | 705/10 |
| 6,308,162 B1 | 10/2001 | Ouimet et al. | |
| 6,341,269 B1 | 1/2002 | Dulaney et al. | |
| 6,366,890 B1 | 4/2002 | Usrey | |

(Continued)

FOREIGN PATENT DOCUMENTS

EP 1271278 A2 2/2003

(Continued)

OTHER PUBLICATIONS

FairMarket to Take Guesswork Out of Sale Pricing With New Performance-Based Markdown Engine; May 21, 2001; Business Wire.*

(Continued)

*Primary Examiner*—Igor N. Borissov
(74) *Attorney, Agent, or Firm*—Chapin IP Law, LLC; Barry W. Chapin, Esq.

(57) ABSTRACT

Price elasticity of sales of an item of commerce is estimated. Based on the price elasticity, a maximum gross margin for the item is determined. The maximum possible gross margin is then used in connection with setting or evaluating markdown scenarios for the item.

9 Claims, 5 Drawing Sheets

U.S. PATENT DOCUMENTS

| | | | |
|---|---|---|---|
| 6,397,166 B1 | 5/2002 | Leung et al. | |
| 6,397,197 B1 | 5/2002 | Gindlesperger | |
| 6,493,678 B1 | 12/2002 | Foster et al. | |
| 6,496,834 B1 | 12/2002 | Cereghini et al. | |
| 6,553,352 B2* | 4/2003 | Delurgio et al. | 705/400 |
| 7,085,734 B2* | 8/2006 | Grant et al. | 705/20 |
| 7,092,929 B1* | 8/2006 | Dvorak et al. | 705/28 |
| 2001/0014868 A1 | 8/2001 | Herz et al. | |
| 2001/0044766 A1 | 11/2001 | Keyes | |
| 2001/0047293 A1 | 11/2001 | Waller et al. | |
| 2002/0022985 A1 | 2/2002 | Guidice et al. | |
| 2002/0029176 A1 | 3/2002 | Carlson et al. | |
| 2002/0072977 A1 | 6/2002 | Hoblit et al. | |
| 2002/0174119 A1 | 11/2002 | Kummamuru et al. | |
| 2003/0028437 A1* | 2/2003 | Grant et al. | 705/26 |
| 2003/0046127 A1* | 3/2003 | Crowe et al. | 705/7 |
| 2003/0110066 A1* | 6/2003 | Walser et al. | 705/7 |
| 2003/0177103 A1* | 9/2003 | Ivanov et al. | 705/400 |

FOREIGN PATENT DOCUMENTS

| | | | | |
|---|---|---|---|---|
| JP | 359062972 A * | 4/1984 | | 705/22 |
| JP | 02001084239 A | 3/2001 | | |
| WO | WO 90/09638 A1 | 8/1990 | | |
| WO | WO 98/21907 * | 5/1998 | | |
| WO | WO 02/29696 A1 | 4/2002 | | |

OTHER PUBLICATIONS

Ackerman, Jerry, "Looking Back to Fashion's Future," The Boston Globe Oct. 7, 1998 [retrieved Jan. 7, 2003], 3 pages, retrieved from: archive.org and Google.com.

Agrawal, Rakesh et al. "Fast Similarity Search in the Presence of Noice, Scaling, and Translation in Time-Series Databases," *Proceedings of the 21st Internaitonal Conference on Very Large Data Bases* Sep. 11-15, 1995.

Datz, Todd, "Pythagorean Pantsuits-Modeling Merchandise," *CIO Magazine*, Feb. 15, 1999 [retrieved Jan. 7, 2003], 1 page, retrieved from Google.com and archive.org.

Gaffney, Scott and Padhraic Smyth, "Trajectory Clustering with Mixtures of Regression Models," *Proceedings: The Fifth ACM SIGKDD International Conference on Knowledge Discovery and Data Mining* Aug. 15-18, 1999, pp. 63-72.

"Gymboree Selects TSI to Design and Implement Inventory Optimization and Pricing Solution," TSI Press Release, Jan. 13, 1999 [retrieved Jan. 7, 2003], 2 pages, retrieved from: Google.com and archive.com.

Jain, Anil K. and Richard C. Dubes, Algorithms for Clustering Data (Prentice Hall: 1988) pp. ix-xi, 1-30.

Keogh, Eamonn and Padhraic Smyth, "A Probabilistic Approach to Fast Pattern Matching in Time Series Databases," *Proceedings of the Third Conference in Knowledge Discovery in Databases and Data Mining* (1997).

Keogh, Eamonn J. and Michael J. Pazzani, "An Enhanced Representation of Time Series Which Allows Fast and Accurate Classification, Clustering and Relevance Feedback," *Fourth Conference on Knowledge Discovery in Databases and Data Mining* (1998) pp. 239-243.

Keogh, Eamonn J. and Michael J. Pazzani, "Relevance Feedback Retrieval of Time Series Data," *22nd International Conference on Research and Development in Information Retrieval*, Aug. 1999.

Keogh, Eamonn, "A Fast and Robust Method for Pattern Matching in Time Series Databases," *Proceedings of WUSS* (1997).

Koloszyc, Ginger, "Merchants Try Complex Mathematical Tools to Improve Inventory Decisions," *Stores Magazine* Nov. 1999 [retrieed Jan. 7, 2003], 3 pages, retrieved from: Google.com and archive.org.

Kopalle, Praveen K. et al. "The Dynamic Effect of Discounting on Sales: Empirical Analysis and Normative Pricing Implications," *Marketing Science* 18:3 (1999) 317-332.

Levy, Michael R. and Woo, Jonathan, Ph.D. "Yield Management in Retail: The Application of Advanced Mathematics to the Retail Pricing Dilemma," TSI (Marketing Materials), 1999.

Makridakis, Spyros, "Forecasting," copyright 1997, John Wiley & Sons, Inc., pp. 312, 373-374.

Merritt, Jennifer, "Company makes Science out of Shopping Trends," *Boston Business Journal* Sep. 3, 1998 [retrieved on Jan. 7, 2003], 3 pages, retrieved from: Google.com and archive.org.

Rice, John A. "Mathematical Statistics and Data Analysis," 2nd Ed. Duxbury Press pp. xiii-xx, 1-30.

Screenshots of Technology Strategy, Inc., www.grossprofit.com, Mar. 2, 2000 [retrieved on Jan. 7, 2003], 9 pages, retrieved from: Google.com and archive.org.

Silva-Risso, Jorge M. et al. "A Decision Support System for Planning Manufacturers' Sales Promotion Calendars," *Marketing Science* 18:3 (1999) 274-300.

Smith, Stephen A. and Achabal, Dale D. "Clearance Pricing and Inventory Policies for Retail Chains," Management Science 44:3 (Mar. 1998), pp. 285-300.

Achabal et al., A Decision Support System for Vendor Managed Inventory, Winter 2000, Journal of Retailing, vol. 76, No. 4, p. 430.

SAS/STAT User's Guide, Version 8 (SAS Publishing: 1999) pp. 1-129.

* cited by examiner

MARKDOWN MANAGEMENT

BACKGROUND

This description relates to markdown management.

A merchandiser who is planning to sell an item of fashion merchandise that has a short-life-cycle (for example, a style of ladies' dress shoes) typically orders an initial inventory of the item at the beginning of a season, sets an initial retail price, and offers the item to customers. Because a fashion item will have little value after the season in which it is offered, the merchandiser watches the inventory level carefully. If the merchandiser believes that sales are not brisk enough to assure that the full inventory will be sold by the end of the season at the initial full price, he will reduce the price one or more times during the season with the goal of increasing the demand in order to clear out the inventory. Decisions about such markdown prices (called markdown management) directly affect the retailer's profit.

The success of markdown management is sometimes measured by the direction and degree of change of sales and gross profit dollars from one year to the next. This approach conflates many factors into one measurement, including buyer decisions, inventory allocation, promotional campaigns, sales force performance, clearance pricing decisions, macroeconomic factors, and the weather.

SUMMARY

In general, in one aspect, the invention features a computer-based method that includes (a) estimating price elasticity of sales of an item of commerce, (b) based on the price elasticity, determining a maximum possible gross margin for the item, and (c) using the maximum possible gross margin in connection with setting or evaluating markdown scenarios for the item. Implementations of the invention include one or more of the following features. The item of commerce comprises an item having a product life cycle no longer than one year. An optimal price schedule is generated for the item based on the maximum possible gross margin. Using the maximum possible gross margin includes analyzing proposed markdown scenarios to identify an optimal scenario that approaches as closely as possible to the maximum possible gross margin. The maximum possible gross margin includes comparing the maximum possible gross margin with gross margins that result from different markdown scenarios as a basis for comparison of the different markdown scenarios. The price elasticity comprises a separable multiplicative function of a non-time dependent elasticity term and a time-dependent base demand term.

In general, in another aspect, the invention features a computer-based method that includes (a) for each item of a group of items of commerce, determining a maximum possible gross margin, and (b) evaluating the merit of a markdown scenario for each of the items by comparing a gross margin that is based on the markdown scenario against the maximum gross margin.

In general, in another aspect, the invention features a computer-based method that includes (a) using historical sales data, expressing a consumer demand for an item of commerce as a product of two factors, one of the factors expressing a non-time dependent price elasticity of the demand for the item, the other factor expressing a composite of time-dependent demand effects, and (b) determining an optimal gross margin of the item of commerce based on the price elasticity factor.

In general, in another aspect, the invention features a method that includes (a) with respect to a week of a selling season of an item of commerce, determining a selling price by fitting a simulation model to historical in-season data about prior sales of the item of commerce, (b) deriving unit sales for the week using a relationship of new sales rate to historical sales rate, historical price, and historical inventory, the relationship not being dependent on a model of sales demand, for subsequent weeks, (c) repeating the selling price determination and the unit sales derivation, until an end of the season is reached, and (d) determining gross margin for the season based on the selling prices and unit sales for the weeks of the season.

Among the advantages of the invention are one or more of the following. The full benefit of revenue generation opportunities on short-life-cycle retail merchandise can be measured and an absolute benchmark ruler can be established. By short-life-cycle we mean a cycle that is a year or less. The markdown scenarios that are generated may be used to evaluate the success of markdown management against an objective measure, to evaluate new analytical models, and to answer business questions (e.g., optimal inventory investment, impact of business rules on gross margin).

Other advantages and features will become apparent from the following description and from the claims.

DESCRIPTION

One goal in measuring the success of markdown management is to define a consistent method to compare the opportunities for improved margin across different items. The performance of markdown management is often measured by considering the total gross margin dollars for a group of items generated by one markdown management system against the total gross margin dollars generated for the group of items by another markdown management system. Such a performance measurement forces one to inherit the maximum gross margin opportunities defined by the merchandising decisions for each item from a predetermined inventory commitment and an initial pricing value for that item. A fairer measurement of markdown management would measure performance of each item against an intrinsic maximum opportunity available for that item, rather than measuring the aggregated total gross margin dollars from one system to other system (or one year to another year) for a group of items.

Figure 1:
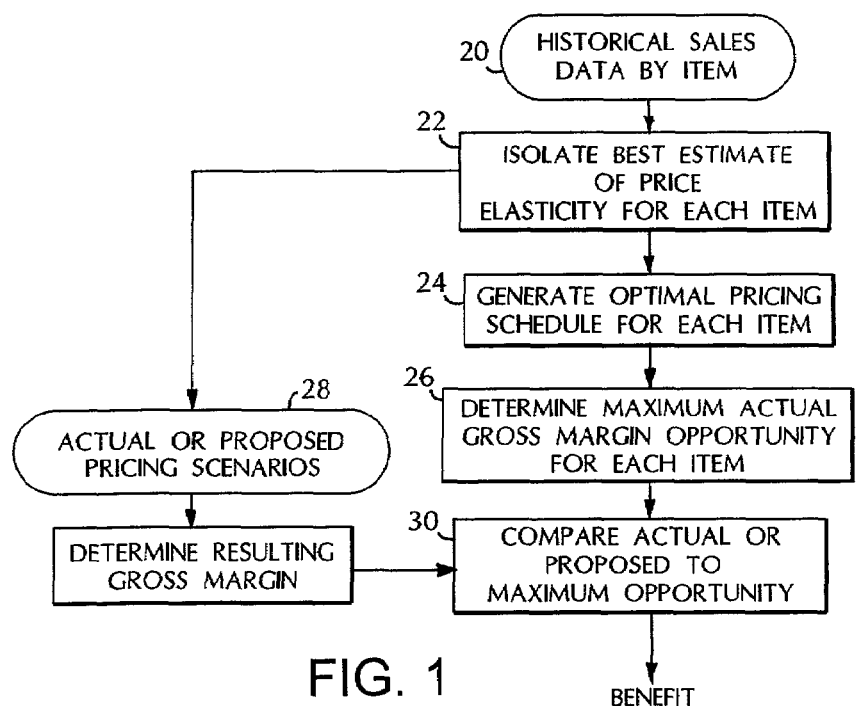
FIG. 1 is a flow chart.

As shown in FIG. 1, one way to establish an intrinsic maximum gross margin opportunity (by maximum gross margin opportunity, we mean the limit that you cannot exceed with perfect knowledge; and by optimal gross margin, we mean the best actual solution that you can generate using a given markdown system) for an item is to analyze historical information about sales of different items 20 to isolate a best estimate of the price elasticity for each item 22. Once the best estimate of an item's price elasticity is obtained, the optimal pricing schedule (e.g., markdown scenario) for the item is generated 24 by searching for an optimal gross margin for the item 26.

Once this optimal gross margin for an item is determined, historical or proposed in-season pricing schedules 28 can be determined using the price elasticity estimate and can be compared against the maximum opportunity available for that item 30.

By an optimal markdown scenario, we mean the timing and depth of a series of markdowns that provide the maximum (theoretical) gross margin for an item by the end of the selling period (e.g., the end of a season).

Within the boundary conditions of an initial inventory amount and an initial retail price, the goal is to maximize the available gross margin opportunity by finding an optimal markdown scenario. Note that, if the initial inventory decision were perfect such that the full inventory would be sold during the season at the full retail price, there would be no reason to take any markdown; in fact, every markdown scenario would hurt the total margin for the item. On the other hand, if a retailer had more inventory than could be sold at the full initial retail price, different markdown scenarios would produce different gross margin results. Therefore, the absolute maximum gross margin of an item depends on the initial inventory and the full retail price, and markdown scenarios will determine how closely one can reach the maximum gross margin opportunity for scenarios that fall within the boundary conditions.

For a given retail merchandise item of commerce having an initial inventory $I_0$ and an initial full price $p_0$, the gross margin function is:

$$GM(I_0, p_0) = \int_{t_0}^{t_e} p(t)S(p, t)dt + p_s(I_0 - S_e) - cI_0, \quad (1)$$

where $p(t)$ is the pricing schedule, $S(p,t)$ is the consumer demand sales rate as a function of price $p$ and time $t$, $p_s$ is the salvage price per unit of the inventory that is unsold at the end of the selling period, $S_e$ is the units sold between start time $t_0$ and the outdate (end of selling period) $t_e$, and $c$ is the cost per unit of the item. Thus, gross margin depends on the pricing schedule, and when the pricing schedule is optimal, the maximum possible gross margin GM* can be achieved. Because the gross margin GM generated by each different pricing schedule for a given item can be meaningfully compared with other merchandise items only relative to the maximum gross margin opportunity GM*, we renormalize the definition of the gross margin GM as:

$$\overline{GM} = \frac{(GM^* - GM)}{GM^*}. \quad (2)$$

The opportunity of a given pricing schedule can thus be thought of in terms of this normalized gross margin $\overline{GM}$ or a normalized gross margin percent which represents the percentage deviation from the optimal gross margin.

Because gross margin also depends on the sales rate as a function of time and price, that is on the consumer demand, we generate a good measurement of a key factor of consumer demand: price elasticity. By price elasticity we mean the sensitivity of the change in demand that is occasioned by a change in price. Using price-elasticity of an item, one can not only estimate the true maximum gross margin opportunity associated with each retail merchandise item, but can also simulate meaningful likely gross margin outcomes for different markdown scenarios. This yields a rigorous way to evaluate the results of different markdown scenarios in an "apple-to-apple" comparison. For each item of a set of items f commerce, a given markdown scenario will produce a value of normalized gross margin that represents the percentage by which the gross margin produced by the scenario falls short of a maximum gross margin for that item. A probability distribution can be expressed for the normalized gross margin percentages for all of the items under consideration. A different markdown scenario applied to all of the items will produce a different probability distribution of normalized gross margin percentages. The merits of the two different markdown scenarios can be compared by analyzing the two probability distributions.

As mentioned with respect to FIG. 1, an item's price elasticity can be estimated 22 by analyzing historic sales data 20. Once the item's elasticity is determined, a postseason (after-the-fact) optimal markdown scenario can be determined 24.

Measuring the absolute maximum gross margin GM* of an item 26 would require perfect knowledge of consumer demand and price elasticity. In the absence of perfect knowledge, we use as much information as possible to make a best estimation of the demand components and price elasticity.

As a base model to represent demand for an item, we use a causal demand model in which the overall demand is decomposed into several causal factors: seasonality, intrinsic product life cycle, inventory effect, and price elasticity. We express the sales rate function as:

$$S(p,t) = SI(t_y)PLC(t)R(p)f(I) \quad (3)$$

where $SI(t_y)$ is a time dependent function that expresses the seasonality of demand (bathing suits are in higher demand in May than in September, for example).

$$PLC(t) = N\left\{(t - t_0)\exp\left[-\frac{(t - t_0)^2}{2t_{pk}^2}\right] + C\right\} \quad (4)$$

is the product life cycle function (fashion shoes have a peak of demand shortly after sales begin, and the demand trails off over time) where $N$ is a normalization parameter, $t_{pk}$ is a model parameter represents the peak time of the product life cycle function, and $C$ a constant baseline offset model parameters (define).

$R(p)$ is the a price elasticity function and is defined in equation 8 below, and the inventory effect function is $$f(I) = \begin{cases} \frac{I}{I_c}, & I < I_c \\ 1, & I \geq I_c \end{cases}, \quad (5)$$

for $$I(t) = I_0 - \int_{t_0}^{t} S(p, t)dt, \quad (6)$$

where $I(t)$ is the inventory at time $t$, the initial inventory is $I_0$, and the critical inventory level $I_c$ is a model parameter, below this number the overall demand goes down by the factor in equation 5 and above this number has no effect. The inventory effect function expresses the notion that sales are adversely affected when the inventory falls below a critical level.

Price elasticity is a key factor in markdown management. The fact that demand changes in response to a markdown (called a markdown effect) is a fundamental dynamic principle of markdown management. Therefore, it is important to separate the markdown effect from other components of the demand function.

We use a separable multiplicative time-independent price elasticity model. Empirical evidence indicates that using a separable multiplicative approach has no significant flaw. Empirical evidence also indicates that using a time-independent formulation is justified. That formulation is also supported by the fact that we are focusing on short-life-cycle items. We express our general demand function as:

$$S(p,t) = R(p)B(t; p_0), \quad (7)$$

where the non-time-dependent price elasticity term is $$R(p; p_0) = \left(\frac{p}{p_0}\right)^{-\gamma}, \quad (8)$$

for a current price p, a full retail price $p_0$, and a price elasticity parameter $\gamma$, and where the time dependent factors are expressed in a single base demand term:

$B(t;p_0)$, which is the base demand at the full retail price $p_0$ as a function of time t.

We want to determine the best estimate of base demand and price elasticity. To do this, we fit the demand model to postseason (after the fact) sales data to make the best estimation of the underlying model parameters. Expressing the sales function using a main variable separation between the base demand and price elasticity makes our approach powerful. Determining the best estimation of the price elasticity function as a multiplicative factor independent of the base (time-dependent) demand model permits adjusting actual sales units in light of any pricing decision independent of the base demand factor.

The postseason optimal pricing schedule is intended to represent the best pricing schedule possible given the client's business rules and observed week-by-week sales for the item. Examples of business rules include "no markdown until 4 weeks after item introduction" and "subsequent markdown interval should be separated by at least 2 weeks". Based on the best-estimated price elasticity function, the actual sales rates of equation 7 are determined for different possible pricing schedules. This process makes overall demand modeling much less critical to the estimation of the maximum gross margin opportunity. Because the actual price, inventory level, and unit sales for each week are known, no assumptions about an underlying seasonality or PLC need to be applied. Simulations of the season with different pricing schedules need only account for the different prices and inventory levels effective each week using the demand model.

The demand model may be summarized in a single equation, which attempts to capture the effect on demand of changes in price and inventory level, relative to their historical values and independent of all other factors. Relative to the observed price p and inventory level I, the new price p' affects demand through the price elasticity $\gamma$, and the new inventory level I' affects demand through the inventory effect and its critical inventory level $I_c$:

$$S' = S\left(\frac{p}{p'}\right)^{\gamma} \frac{\max\left(\frac{I'}{I_c}, 1\right)}{\max\left(\frac{I}{I_c}, 1\right)}, \quad (9)$$

where S is the original observed sales rate and S' is a simulated sales rate at price p' and inventory I'. As shown in equation 9, there is no explicit dependence on the sales rate demand model but only to actual sales rate units.

Note that for $\gamma > 0$, as usually assumed, this implies that lower prices will drive greater sales. Also, at inventories below the critical inventory level, decreasing inventory will result in decreasing sales. The basic form of both of these dependencies has been verified by fitting product life cycle data (PLC) to sales data of individual items for many retailers. In any given case, the values of $\gamma$ and $I_c$ will be determined from a postseason fit to the sales data and should be reliable. Thus, as long as the relative changes in price and inventory level are not too severe, equation 9 should provide a good estimate of the sales that would have been realized under a new markdown scenario. In particular, no assumptions about item seasonality or an underlying PLC need to be made.

Figure 6:
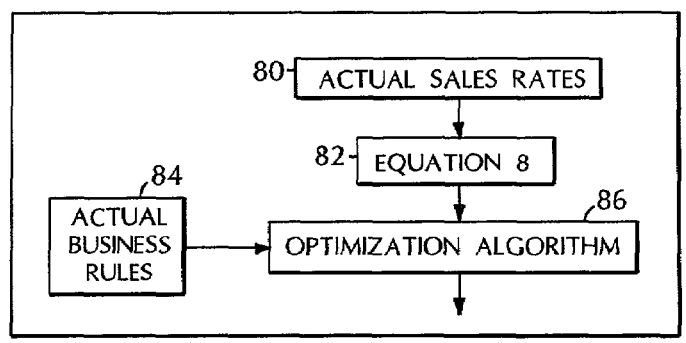
FIG. 6 is a flow chart.

As shown in FIG. 6, in an actual simulation, the actual sales rates 80 are adjusted 82 only by equation 9 and actual business rules 84 are applied to search 86 for an optimal markdown scenario using, for example, either a genetic algorithm or exhaustive search algorithm. In addition to allowing a good postseason estimate of an optimal markdown scenario for an item, this technique of adjusting sales week by week to reflect changes in price and inventory also represents a good method for evaluating alternative proposed markdown scenarios against one another and against actual history. The procedure is used with equation 9 applied to the historical data and to the new pricing schedule, week by week, to calculate the new sales history and cumulative gross margin.

An ultimate goal is to perform in-season simulation of markdown scenarios while the season is in progress. For each week of a simulated season, the simulation software will be applied to make a fit to historical data and determine a new price. The new price will be implemented and the sales history adjusted by equation 9. At the end of the season, outdate salvage values will be evaluated for the remaining inventory and the total gross margin will be calculated. In the weekly simulation process, there are two price elasticity functions. The best price elasticity parameter estimated from the postseason model fit is used to apply sales rate adjustment according to equation 9; while, as an in-season simulation is occurring, a limited weekly data sample is used to make the best estimation of the demand model parameters including the in-season price elasticity estimation.

Empirical results have obtained from using an actual specialty retailer's data to perform two components of data analysis and simulation: analytic model fit and post-season optimal markdown scenario measurement.

Figure 2:
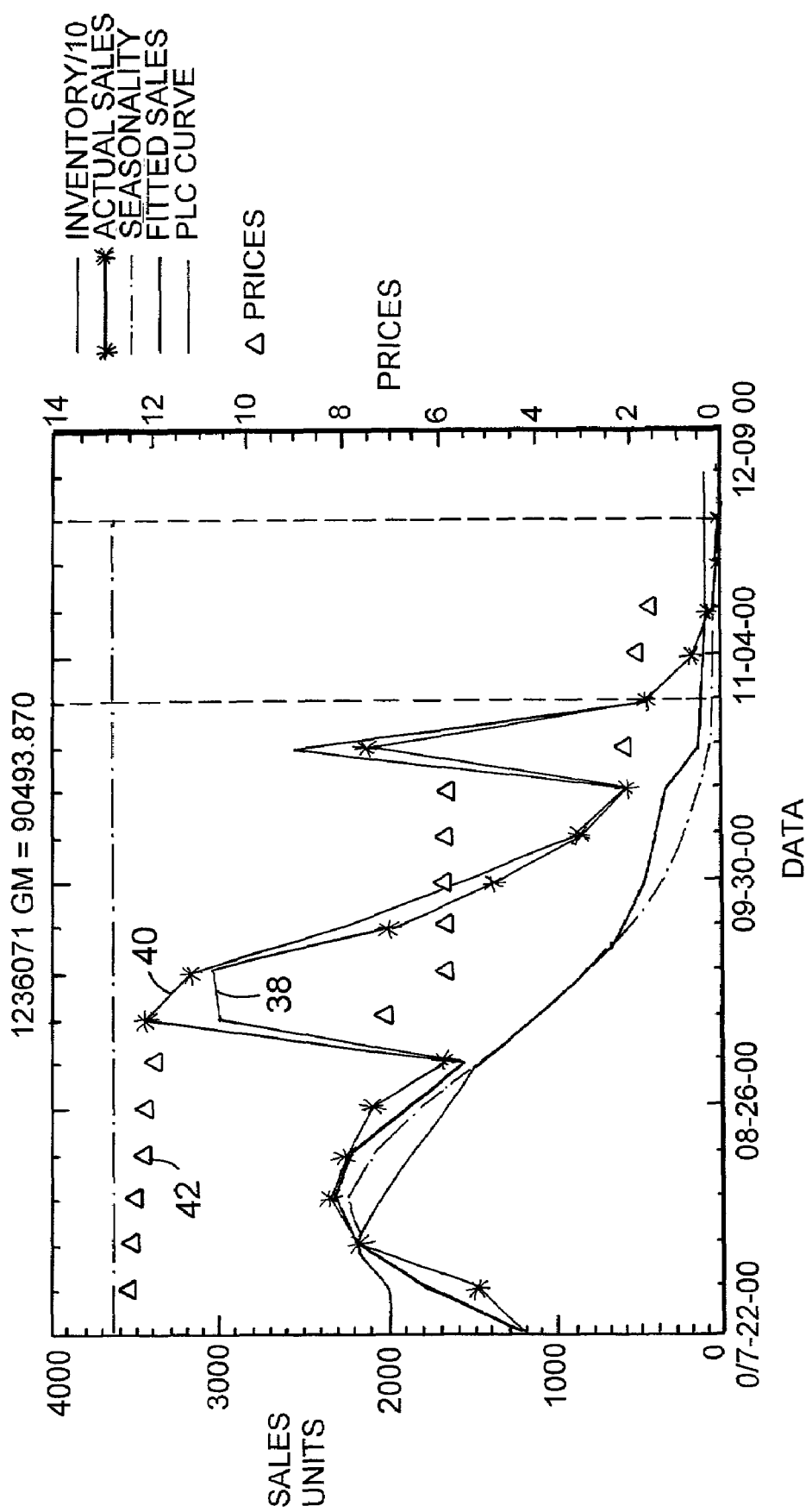
FIGS. 2 and 3 are graphs.
Figure 3:
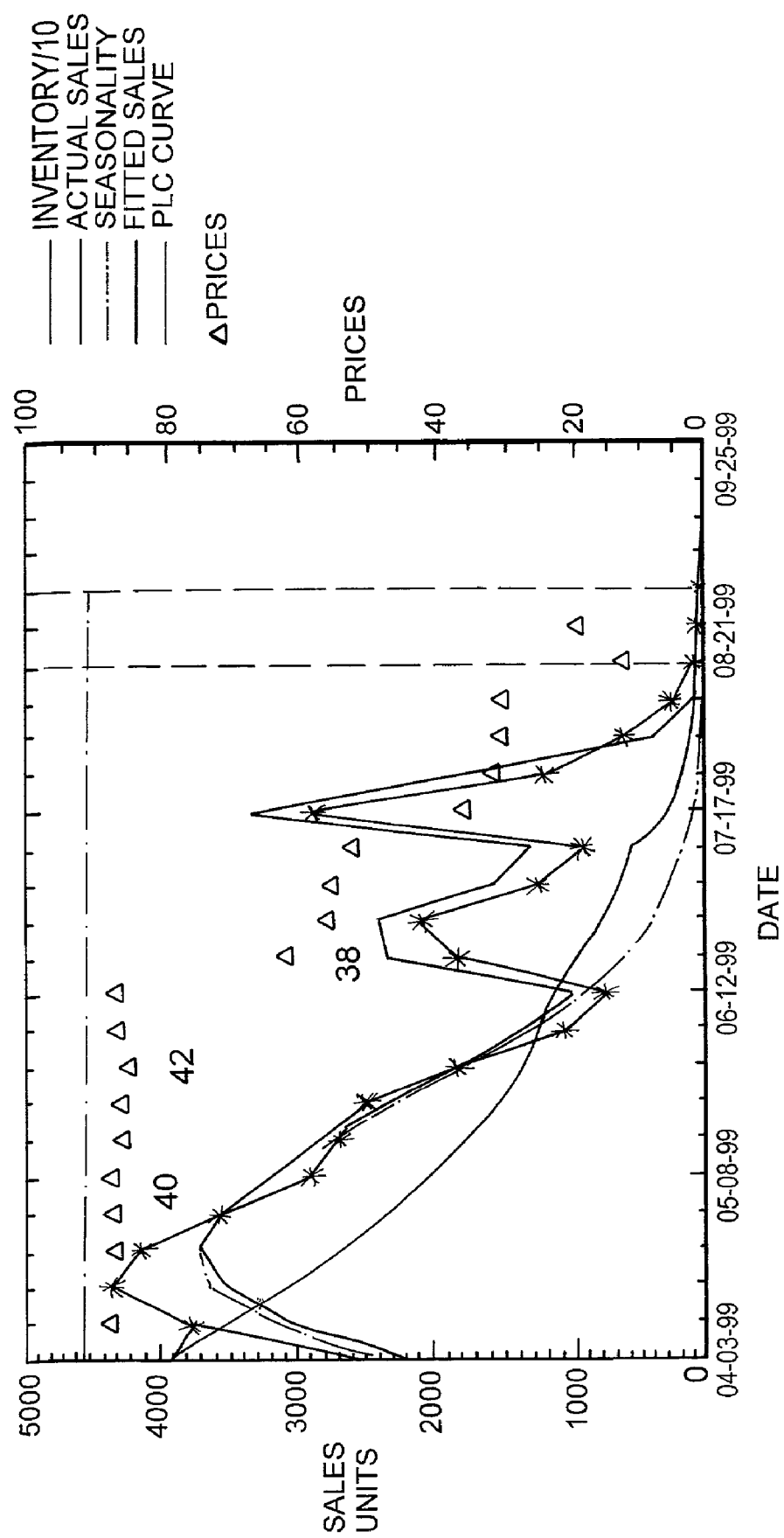

Examples of the baseline demand model (equations 3-8) as fit to actual data from a retailer are shown in FIGS. 2 and 3. The example of FIG. 2 shows data from one specialty retailer and FIG. 3 shows data from another specialty retailer. (Both retailers sell women's merchandise). The overall baseline demand model is represented by solid black lines 38 and the actual sales unit data 40 are represented by blue starred lines. By analyzing the difference between these two lines, one can see how good the model fits the actual data. We use least-square minimization based on the chi-square statistics for fitting. The search algorithm is the genetic algorithm.

Finding a way to obtain an accurate measurement of price elasticity is a key objective of the model fitting process. As shown in FIGS. 2 and 3, a typical pricing schedule 42 is essentially a series of steps. The most sensitive price elasticity information is embedded in the boundaries of the price steps (please define what you mean by boundaries of the price steps (e.g., significant price changes week to week)). Our fitting algorithm takes advantage of this insight by weighting the effects of bigger week-to-week price changes more heavily relative to the full price more heavily. This weighting consistently causes the model to better follow the sales demand change from the markdown effect.

Figure 4:
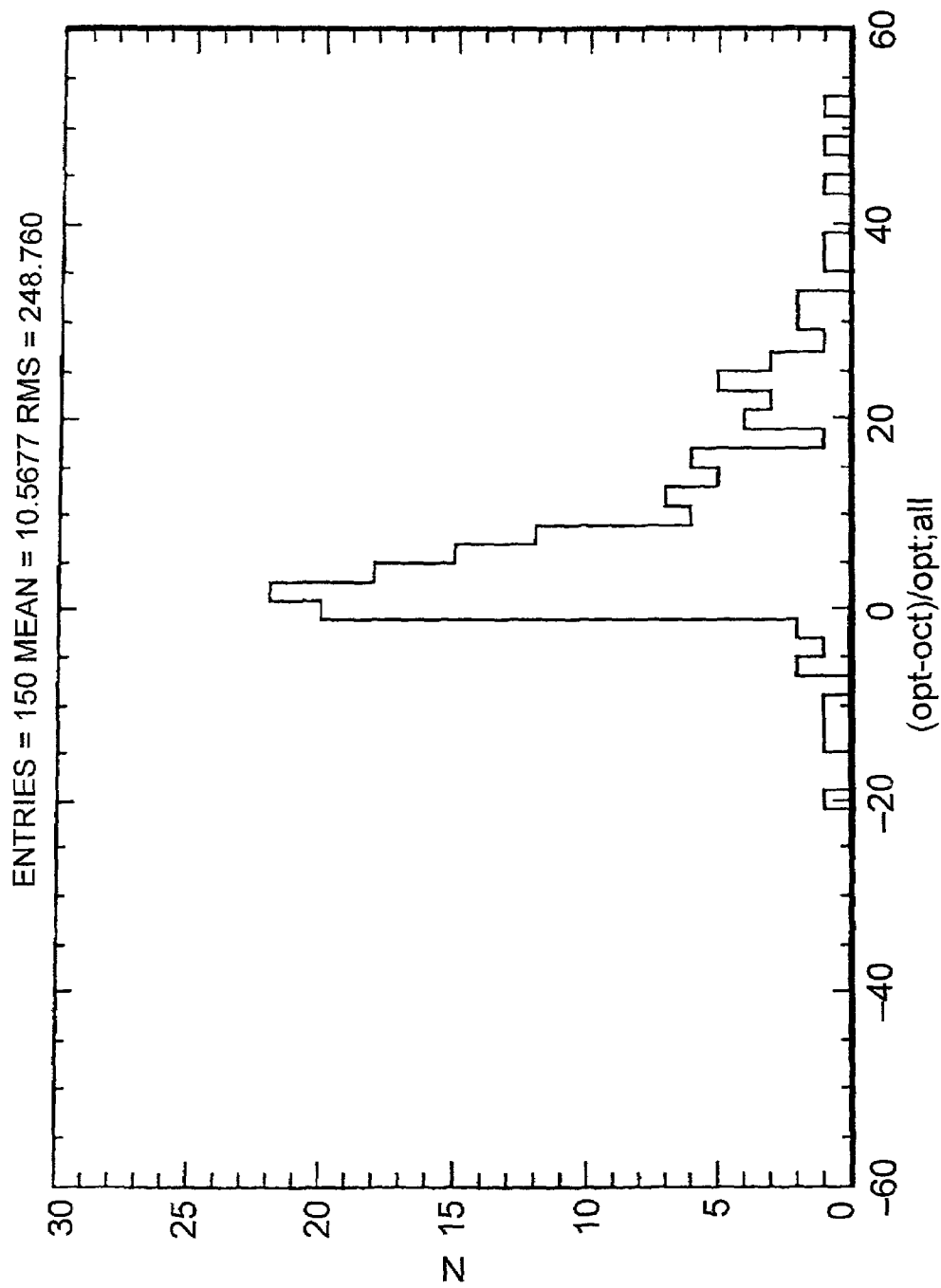
FIG. 4 is a price elasticity chart.
Figure 5:
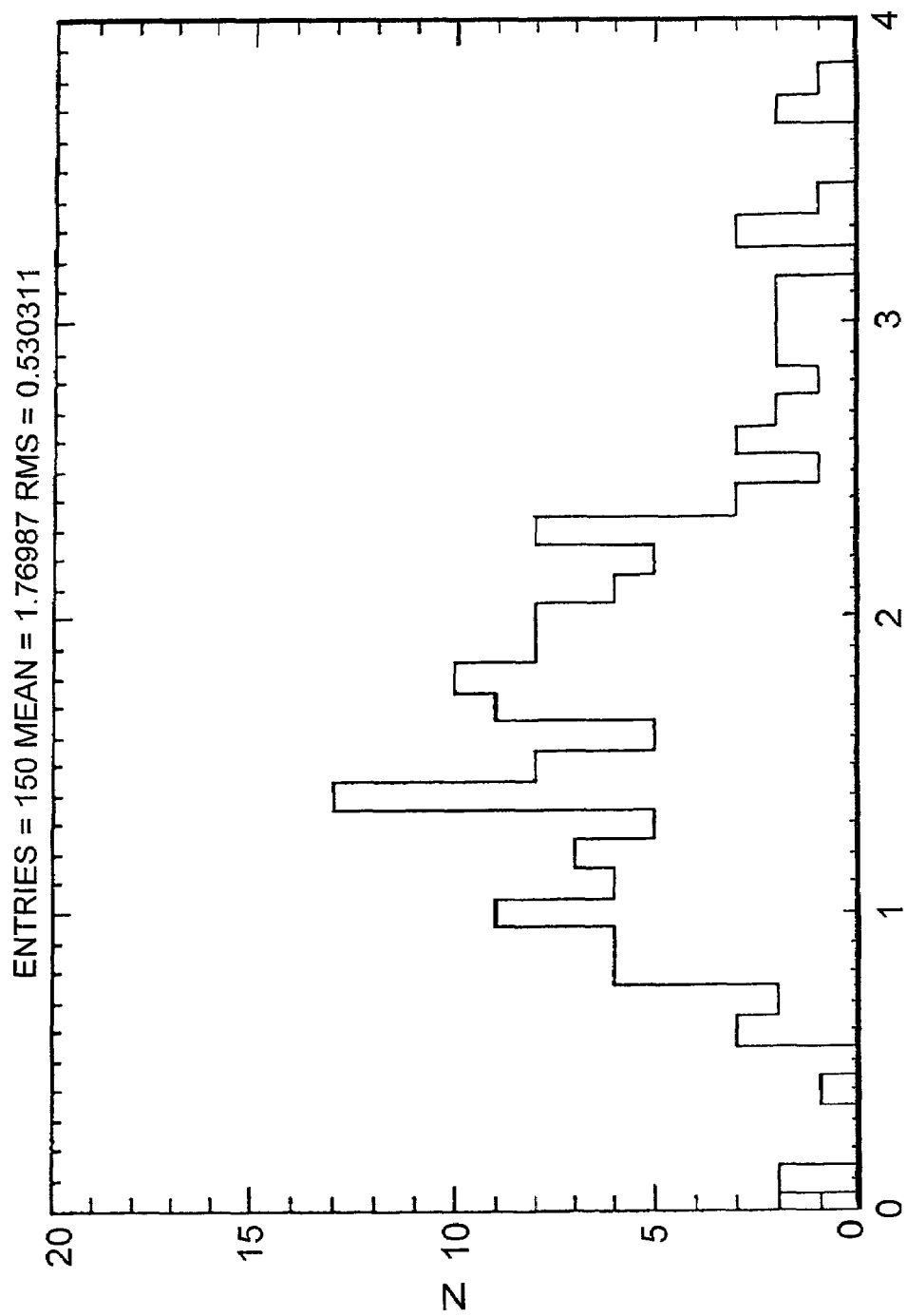
FIG. 5 is a histogram of gross margin percentages.

A summary plot of price elasticity estimated from model fittings with historic data for 150 items is shown in FIG. 4. The plot shows a reasonable distribution with most items falling between price elasticity parameters (gamma) of 1.0 to 2.5. FIG. 5 shows the number density distribution of percent gross margin differences between post-season optimal simulation results and actual historic data for 150 items normalized by the optimal results for the 150 items. This plot shows that there is room to improve gross margin of these items by 11% on average.

Figure 7:
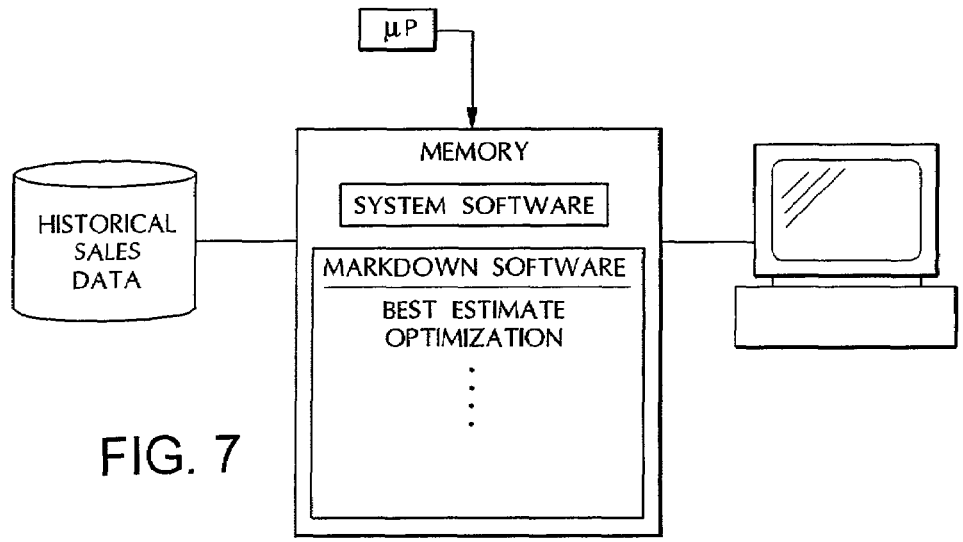
FIG. 7 is a block diagram.

The techniques described above can be implemented in software or hardware or a combination of them. For example, as shown in FIG. 7, the historical sales data may be stored on a mass storage medium 90 for use by a server 92. The server includes a microprocessor 94 controlled by system software 96 and markdown software 98 stored in memory 100. The markdown software performs all of the functions described above including the best estimation of price elasticity and the optimization processes.

Although some examples have been discussed above, other implementations are also within the scope of the following claims.

The invention claimed is:

1. A computer-based method of markdown management comprising:
   inputting to a computer system historical sales data for an item of commerce;
   calculating, with the computer system, a price elasticity of sales of the item of commerce as a function of an historically observed consumer demand rate reflected by historical sales data, said calculating step including fitting a demand model to that historically observed consumer demand rate of the item of commerce, said historically observed consumer demand rate including a non-time-dependent price elasticity term;
   determining, with the computer system, a simulated sales rate of the item of commerce that would have been realized under a price markdown scenario, the determining of the simulated sales rate taking into account the price elasticity of sales of the item of commerce as a function of an historically observed consumer demand rate reflected by historical sales data;
   generating, with the computer system, an estimate of a maximum possible gross margin for the item of commerce, where the maximum possible gross margin include the simulated sales rate under the price markdown scenario as a function of price p and time t; and
   generating with the computer a display showing differences between the maximum possible gross margin and the historical sales data for use by sales personnel in evaluating pricing of the item.

2. The method of claim 1 further comprising analyzing proposed markdown scenarios to identify an optimal scenario that approaches the maximum possible gross margin.

3. The method of claim 2 in which the analyzing step includes comparing the maximum possible gross margin with gross margins that result from different markdown scenarios as a basis for comparison of the different markdown scenarios.

4. The method of claim 1 wherein said calculating a price elasticity further comprises using a function including at least one of a time-dependent base demand term and a non-time dependent elasticity term.

5. The method of claim 1 further comprising:
   determining a maximum possible gross margin for each item of a group of items of commerce; and
   evaluating the merit of a markdown scenario for each of the items by comparing a gross margin that is based on the markdown scenario against the maximum gross margin.

6. The method of claim 1 further comprising:
   expressing a consumer demand for an item of commerce as a product of a first factor and a second factor, said first factor expressing a non-time dependent price elasticity of the demand of the item and the second factor expressing a composite of time-dependent demand effects; and
   determining an optimal gross margin of the item of commerce based on said price elasticity factor.

7. The method of claim 1 further comprising:
   determining a selling price of an item for a predetermined period of time by fitting a simulation model to historical in-season data about prior sales of said item;
   deriving unit sales for the predetermined period of time using a relationship of new sales to historical sales rate, historical price and historical inventory;
   repeating said selling price determination and unit sales derivation for subsequent predetermined periods of time; and
   determining gross margin for the season based on the selling prices and unit sales for said predetermined periods of time.

8. The method of claim 1, wherein said determining of the simulated sales rate further includes taking into account the historically observed consumer demand sales rate of the item of commerce, a historically observed price of the item of commerce reflected by the historical sales data, the price of the item of commerce under the price markdown scenario, a historically observed inventory level of the item of commerce reflected by the historical sales data, a new inventory level of the item of commerce under the markdown scenario, a critical inventory level of the item of commerce, and the price elasticity parameter of the item of commerce.

9. The method of claim 1 wherein said generating, with the computer system, an estimate of a maximum possible gross margin for the item of commerce includes taking into account a full retail price of the item of commerce, a start time, an end of a selling period for the time of commerce, a salvage price per unit of the inventory that is unsold at the end of the selling period, the units of the item of commerce sold between start time and end of selling period, and a cost per unit of the item of commerce.

* * * * *